United States Patent
Yu et al.

(10) Patent No.: US 11,735,746 B2
(45) Date of Patent: Aug. 22, 2023

(54) CATALYST COMPLEX FOR FUEL CELL AND METHOD OF MANUFACTURING SAME

(71) Applicants: Hyundai Motor Company, Seoul (KR); Kia Motors Corporation, Seoul (KR); Korea Advanced Institute of Science and Technology, Daejeon (KR)

(72) Inventors: Jung Han Yu, Gyeonggi-do (KR); Bo Ki Hong, Seoul (KR); Jong Kil Oh, Gyeonggi-do (KR); Hyun Joo Lee, Daejeon (KR); Chi Woo Roh, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 558 days.

(21) Appl. No.: 16/842,459

(22) Filed: Apr. 7, 2020

(65) Prior Publication Data
US 2020/0411881 A1   Dec. 31, 2020

(30) Foreign Application Priority Data

Jun. 27, 2019 (KR) .................. 10-2019-0076736

(51) Int. Cl.
| | | |
|---|---|---|
| H01M 4/00 | (2006.01) | |
| H01M 4/86 | (2006.01) | |
| H01M 4/92 | (2006.01) | |

(52) U.S. Cl.
CPC ......... *H01M 4/8652* (2013.01); *H01M 4/923* (2013.01); *H01M 4/925* (2013.01)

(58) Field of Classification Search
None
See application file for complete search history.

(56) References Cited

U.S. PATENT DOCUMENTS

| 3,976,560 A * | 8/1976 | Erickson ................ C10G 35/09 208/138 |
| 2005/0009696 A1* | 1/2005 | Mao ..................... B01J 37/0211 502/185 |

FOREIGN PATENT DOCUMENTS

| JP | 5755833 B2 | 7/2015 |
| JP | 6174039 B2 | 8/2017 |

(Continued)

OTHER PUBLICATIONS

Kim et al, Fabrication of iridium oxide nanoparticles supported on activated carbon powder by flashlight irradiation for oxygen evolutions, materials science and engineering, B, 201, 29-34 (Year: 2015).*

(Continued)

*Primary Examiner* — Stefanie J Cohen
(74) *Attorney, Agent, or Firm* — Fox Rothschild LLP

(57) ABSTRACT

Disclosed is a catalyst complex for a fuel cell. The catalyst complex includes a support including carbon (C), platinum (Pt) supported on the support, and an iridium (Ir) compound supported on the support, and the iridium compound includes at least one of iridium oxide represented by Chemical Formula 1, $IrO_x$, and iridium-transition-metal oxide represented by Chemical Formula 2, $IrMO_x$, wherein M is a transition metal selected from the group consisting of Fe, Co, Cu, Ni and combinations thereof, and x is from 1 to 2.

16 Claims, 10 Drawing Sheets

(56) References Cited

FOREIGN PATENT DOCUMENTS

| JP | 2017-179408 A | 10/2017 |
|----|---------------|---------|
| KR | 10-1082859 | 11/2007 |
| KR | 10-1664627 | 10/2016 |

OTHER PUBLICATIONS

Kim et al, Fabrication of iridium oxide nanoparticles supported on activated carbon powder by flashlight irradiation for oxygen evolutions, Materials Science and Engineering B 201, pp. 29-34 (Year: 2015).*

Jiang et al, Electrodeposited Cobalt-Phosphorous-Derived Films as Competent Bifunctional Catalysts for Overall Water Splitting, Angew. Chem. Int. Ed, 54, pp. 651-6254 (Year: 2015).*

Bo Ki Hong et al., Journal of Power Sources 328 280-288 (2016).

Shanna D Knights et al., Journal Power Sources, 127, 127-134 (2004).

T. R. Ralph and M.P. Hogarth, Platinum Metal Review, 46, 117-135 (2002).

J. Zhu et al., "Corrosion of continuous alumina-fibre reinforced Al-2 wt.% Cu-T6 metal-matrix composite in 3.15 wt.% NaCl solution". Corrosion Science, 52 (2010), pp. 406-415.

R. Jia et al., "Contamination and moisture absorption effects on the mechanical properties of catalyst coated membranes in PEM fuel cells", International Journal of Hyodrogen Energy, 37 (2012), pp. 6790-6797.

B. Kienitz et al., "Cationic Contamination Effects on Polymer Electrolyte Membrane Fuel Cell Performance", Journal of the Electrochemical Society, 158(9), pp. B1175-B1183 (2011).

\* cited by examiner

CATALYST COMPLEX FOR FUEL CELL AND METHOD OF MANUFACTURING SAME

CROSS REFERENCE TO RELATED APPLICATION

The present application claims priority based on Korean Patent Application No. 10-2019-0076736, filed on Jun. 27, 2019, the entire content of which is incorporated herein for all purposes by this reference.

TECHNICAL FIELD

The present invention relates to a catalyst complex for a fuel cell and a method of manufacturing the same.

BACKGROUND

Generally, a polymer electrolyte membrane fuel cell (PEMFC) has been applied in a fuel cell for a vehicle. This polymer electrolyte membrane fuel cell has to operate stably in a wide current density range in order to exhibit normal high power-output performance of at least tens of kW under various operating conditions encountered by vehicles.

Typically, a polymer electrolyte membrane fuel cell has been used in the form of a stack assembled by stacking unit cells to meet a required power output level. Also, a membrane-electrode assembly (MEA) is located in the innermost position of the unit cell structure of the fuel cell stack, and the membrane-electrode assembly (MEA) may include an electrolyte membrane, capable of moving protons, and an anode and a cathode, applied on respective sides of the electrolyte membrane. Hereinafter, the term "fuel cell" may mean a polymer electrolyte membrane fuel cell.

Furthermore, a gas diffusion layer (GDL) and a gasket are stacked on the outside of the MEA. The outer portion where the anode and the cathode are located, and a separator or bipolar plate that provides a flow field through which reactive gas, cooling water, and water generated by the reaction flow may be bonded to the outside of the gas diffusion layer (GDL). In the electrochemical reaction for the generation of electricity by the polymer electrolyte membrane fuel cell, hydrogen supplied to the anode, which is the oxidation electrode of the fuel cell, is separated into protons and electrons, after which the protons move toward the cathode, which is the reduction electrode, through the polymer electrolyte membrane, and the electrons move to the cathode through the external circuit, and at the cathode, the oxygen molecules, protons and electrons react together to generate electricity and heat, along with water as a reaction byproduct. Although the appropriate amount of water produced during the electrochemical reaction in the fuel cell plays a desirable role in maintaining the humidification of the membrane-electrode assembly (MEA), if excessive water is generated and not removed properly, "overflow" or "flooding" of water occurs at high current density, and this flooded water prevents the reactive gases from being efficiently supplied into the fuel cell, undesirably further increasing the voltage loss.

SUMMARY OF THE INVENTION

In one preferred aspect, provided is a catalyst complex included in a membrane-electrode assembly (MEA), which may be a highly dispersed high-activity voltage reversal catalyst, to thus improve the irreversible voltage reversal phenomenon.

In one preferred aspect, provided is a catalyst complex, in which $IrO_x$ and Pt may be supported together on a carbon support and in which a highly dispersed structure may be also formed, unlike a conventional electrode structure, in which the distribution of $IrO_x$ is limited.

The objectives of the present invention are not limited to the foregoing, and other specific contents of the present invention are incorporated in the following description and the accompanying drawings.

In an aspect, provided is a catalyst complex that may be included in an electrode for a fuel cell. The catalyst complex may include a support including carbon (C), platinum (Pt) supported on the support, and an iridium (Ir) compound supported on the support. The iridium compound may include at least one of iridium oxide represented by Chemical Formula 1 below and iridium-transition-metal oxide represented by Chemical Formula 2 below.

$$IrO_x \quad \text{[Chemical Formula 1]}$$

$$IrMO_x \quad \text{[Chemical Formula 2]}$$

Here, M is a transition metal selected from the group consisting of Fe, Co, Cu, Ni and combinations thereof, and x is from 1 to 2.

A weight ratio of platinum (Pt) and iridium (Ir) in the iridium oxide may suitably be about 1:0.5 to 1:1.

A weight ratio of platinum (Pt) and iridium (Ir) in the iridium-transition-metal oxide may suitably be about 1:0.5 to 1:1, and an atomic ratio of the platinum (Pt) and the transition metal (M) in the iridium-transition-metal oxide may suitably be about 1:1 to 1:5.

In an aspect, provided is a method of manufacturing a catalyst complex included in an electrode for a fuel cell. The method may include preparing a starting solution including a platinum-supported support and an iridium precursor to a solvent, obtaining an intermediate product including the platinum-supported support and iridium particles by heat-treating the starting solution, supporting the iridium particles on the platinum-supported support by adjusting the pH of the intermediate product, drying the resulting product, and oxidizing the iridium particles.

In the preparing the starting solution, the solvent may be adjusted to a basic pH.

The intermediate product may be suitably obtained by heat-treating the starting solution at a temperature of about 100° C. to 200° C. for about 1 hr to 5 hr in an inert gas atmosphere.

The intermediate product may be made acidic in a pH range of about 0.5 to 3.0 and thus the iridium particles may be supported on the platinum-supported support.

The iridium particles may be oxidized by heat-treating the dried product at a temperature of about 200° C. to 400° C. for about 1 hr to 5 hr in air.

The starting solution may be further include a transition metal precursor, so the intermediate product may include the platinum-supported support, the iridium particles and transition metal particles is obtained.

The pH of the intermediate product may be adjusted to thus support the iridium particles and the transition metal particles on the platinum-supported support, the resulting product may be dried, and the iridium particles and the transition metal particles may be oxidized.

In an aspect, provided is a method of manufacturing a catalyst complex included in an electrode for a fuel cell. The method may include preparing a starting solution including an iridium precursor to a solvent, obtaining an intermediate product including iridium particles by heat-treating the starting solution, adding a platinum-supported support to the intermediate product and supporting the iridium particles on the platinum-supported support by adjusting the pH of the intermediate product, drying the resulting product, and oxidizing the iridium particles.

In the preparing the starting solution, the solvent may be adjusted to a basic pH.

The intermediate product may be obtained by heat-treating the starting solution at a temperature of about 100° C. to 200° C. for about 1 hr to 5 hr in an inert gas atmosphere.

The intermediate product may include the platinum-supported support, after which the intermediate product may be made acidic in a pH range of about 0.5 to 3.0 and thus the iridium particles may be supported on the platinum-supported support.

The iridium particles may be oxidized by heat-treating the dried product at a temperature of about 200° C. to 400° C. for about 1 hr to 5 hr in air.

The starting solution may further include a transition metal precursor, so the intermediate product may include the iridium particles, transition metal particles, and the platinum-supported support. For example, the intermediate product including the iridium particles and the transition metal particles may be added with the platinum-supported support. The pH of the intermediate product may be adjusted to thus support the iridium particles and the transition metal particles on the platinum-supported support, the resulting product may be dried, and the iridium particles and the transition metal particles may be oxidized.

Further provided is an electrode including the catalyst complex as described herein. For example, the catalyst complex may be manufactured by the methods described herein.

In a catalyst complex for a fuel cell and a method of manufacturing the same according to various exemplary embodiments of the present invention, an iridium compound may be supported on a platinum-supported carbon support, thus exhibiting excellent electrical connectivity and increasing catalytic activity by virtue of uniform distribution thereof on the carbon support.

Also, voltage reversal tolerance may be enhanced by increasing electrical connectivity and water decomposition activity upon voltage reversal in a fuel cell.

Therefore, when a voltage reversal occurs in the fuel cell, it may be controlled stably compared to conventional cases, making it possible to increase the lifespan of the fuel cell stack and also to realize cost reduction by decreasing the replacement cost.

The effects of the present invention are not limited to the foregoing, and should be understood to include all effects that can be reasonably anticipated from the following description.

DETAILED DESCRIPTION

Figure 1:
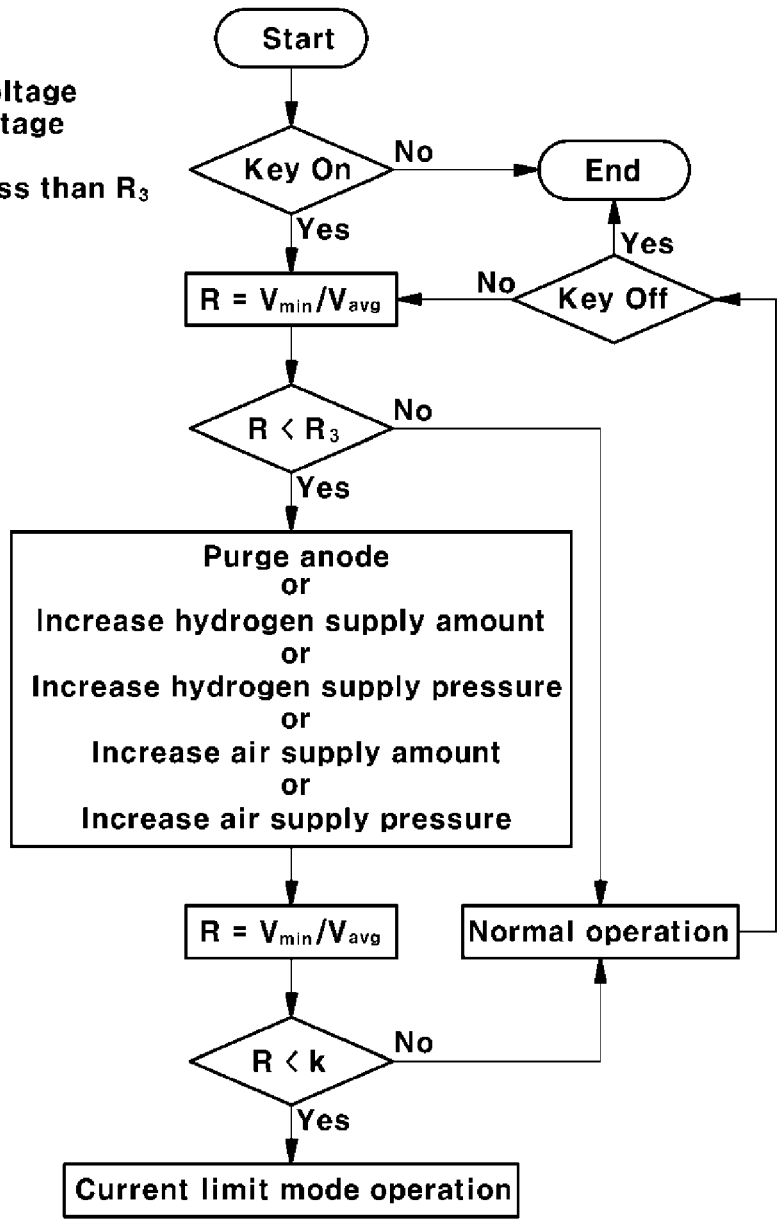
FIG. 1 shows a control logic when a voltage drop occurs during the operation of a fuel cell according to a conventional technique.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a detailed description will be given of the present invention with reference to the drawings.

FIG. 1 shows a control logic when a voltage drop occurs during the operation of a fuel cell according to a conventional technique.

As shown in FIG. 1, the control logic may be applied when cell performance is reversibly restored, like a water-flooding phenomenon in which cell performance deteriorates attributable to obstruction of the flow of reactive gases (hydrogen and oxygen in air) due to water accumulated or gathered in a fuel cell stack. However, the application thereof may be limited in the irreversible deterioration mode. For example, cell voltage reversal may be caused by hydrogen fuel starvation, in which the anode used for the fuel cell is lacking in hydrogen fuel, due to various causes such as water flooding in the fuel cell, ice generation in the winter season, and abnormality of a hydrogen fuel supply device.

The occurrence of voltage reversal is known to significantly lower the cell voltage by adversely affecting the performance of the fuel cell as reported in the related art.

Generally, hydrogen fuel starvation may be broadly classified into overall hydrogen starvation, in which the hydrogen supply becomes insufficient in the entire fuel cell, and local hydrogen starvation, in which the overall hydrogen supply of the cell is sufficient but there occurs a partial lack of hydrogen supply due to uneven distribution thereof. Hydrogen fuel starvation may occur frequently under operating conditions such as uneven supply and distribution of hydrogen gas, a sudden increase in fuel cell load requirements, and fuel cell start-up. For example, when the anode is short of hydrogen, the anode voltage ($V_{anode}$) increases. However, when the anode voltage continues to increase, the anode voltage increases more than the cathode voltage ($V_{cathode}$), resulting in a voltage reversal state in which the cell voltage ($V_{cell}$) becomes smaller than zero ($V_{cell}=V_{cathode}-V_{anode}<0$). In the voltage reversal state, due to an increase in the anode voltage, a water electrolysis reaction first occurs as shown in the following Scheme 1.

[Scheme 1]

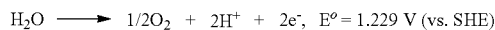

$H_2O \longrightarrow 1/2 O_2 + 2H^+ + 2e^-$, $E^o = 1.229$ V (vs. SHE)

(where $E^o$ is a standard electrode potential and SHE is a standard hydrogen electrode)

However, as the anode voltage continues to increase, the carbon corrosion reaction at the anode accelerates, as shown in the following Schemes 2 and 3.

[Scheme 2]

$C + 2H_2O \longrightarrow CO_2 + 4H^+ + 4e^-$, $E^o = 0.207$ V (vs. SHE)

[Scheme 3]

$C + H_2O \longrightarrow CO + 2H^+ + 2e^-$, $E^o = 0.518$ V (vs. SHE)

When the cell voltage reversal continues and thus reaches an excessive voltage reversal state in which the cell voltage is less than about −2 V, heat generation in the fuel cell becomes excessive, and the membrane-electrode assembly (MEA) and the gas diffusion layer (GDL) may be damaged. In particular, a pinhole may be formed in the membrane-electrode assembly (MEA). Furthermore, problems in which the cell is electrically shorted may occur. In this case, cell failure in which the fuel cell cannot operate normally may result. Therefore, overall hydrogen starvation may be relatively easily detected by monitoring the hydrogen supply state using a sensor in a fuel-cell-operating system ("Balance of Plant"), but the local hydrogen starvation in some cells may only be detected by closely monitoring each cell of the fuel cell stack with a stack-voltage-monitoring device, thus requiring an additional measure such as a complicated control system. Hence, it is necessary to fundamentally solve the above phenomenon. Conventionally, a method of adding $RuO_2$, $IrO_2$, $TiO_2$, etc. to the anode to induce a water decomposition reaction rather than a carbon corrosion reaction has been used. $RuO_2$, $IrO_2$, and $TiO_2$, in that order, are preferable from the aspect of alleviating voltage reversal. However, considering both the performance and the durability of the catalyst at the same time, it is preferable to use mainly $IrO_2$.

In order to realize a more stable hydrogen electric vehicle, the catalyst complex according to exemplary embodiments of the present invention may exhibit high activity of a voltage reversal catalyst and excellent tolerance to voltage reversal compared to when $IrO_2$ is conventionally simply added to electrodes.

Below is a description of the catalyst complex for a fuel cell according to the present invention in comparison with a conventional catalyst.

Figure 2:
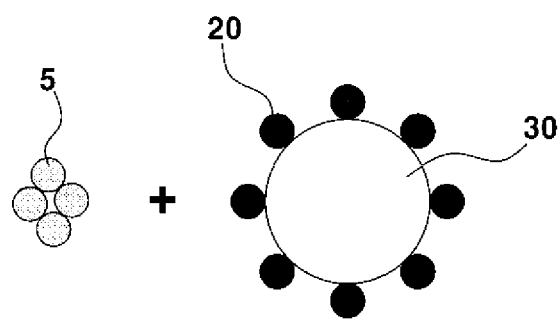
FIG. 2 schematically shows a conventional catalyst for a fuel cell.
Figure 3:
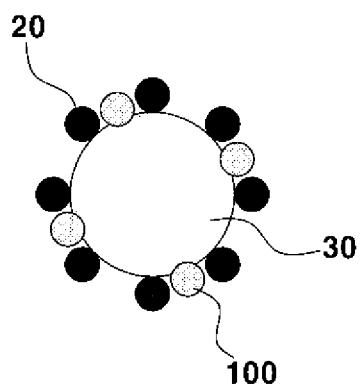
FIG. 3 schematically shows an exemplary catalyst complex for an exemplary fuel cell according to an exemplary embodiment of the present invention.

FIG. 2 schematically shows a conventional catalyst for a fuel cell and FIG. 3 schematically shows an exemplary catalyst complex for an exemplary fuel cell according to an exemplary embodiment of the present invention.

As shown in FIG. 2, in the conventional technique, an electrode (e.g. an anode) may be formed by mixing iridium oxide ($IrO_2$) 5 with a catalyst (i.e. Pt/C) configured such that platinum 20 is supported on a carbon support 30. Thus, iridium oxide 5 aggregates or is present in the form separated from the platinum-supported carbon support (Pt/C), whereby limitations are imposed on the electrochemical water decomposition activity of iridium oxide 5. Therefore, a fuel cell including the above catalyst may undergo degradation due to voltage reversal during the operation thereof.

According to exemplary embodiments of the present invention, as shown in FIG. 3, the catalyst complex may be configured such that platinum 20 and an iridium compound 100 (e.g. iridium oxide ($IrO_x$)) may be supported together on a carbon support 30. In addition to iridium oxide ($IrO_x$) as the iridium compound 100, an iridium-transition-metal oxide may be supported together with the platinum 20 on the carbon support 30.

The catalyst complex included in the electrode for a fuel cell according to the exemplary embodiments of the present invention may include a support 30 including carbon (C), platinum 20 supported on the support 30, and an iridium (Ir) compound 100 supported on the support 30.

The iridium compound 100 may suitably include at least one of iridium oxide represented by Chemical Formula 1 below and iridium-transition-metal oxide represented by Chemical Formula 2 below.

$$IrO_x \quad \text{[Chemical Formula 1]}$$

$$IrMO_x \quad \text{[Chemical Formula 2]}$$

Here, M is a transition metal selected from the group consisting of Fe, Co, Cu, Ni and combinations thereof, and x is 1 to 2.

Thus, in the carbon support 30 having the iridium compound 100 and the platinum 20 supported thereon (e.g. the iridium-oxide-and-platinum-supported carbon support (Pt—$IrO_x$/C)), the iridium compound 100 (e.g. iridium oxide ($IrO_x$)) may be supported on the carbon support 30, thus manifesting excellent electrical connectivity, and may also be uniformly distributed on the carbon support 30, thus increasing catalytic activity compared to conventional cases.

For example, when the iridium compound 100 includes iridium oxide ($IrO_x$), the weight ratio of platinum (Pt) and iridium (Ir) may suitably fall in the range of, for example, about 1:0.5 to 1:1.

Further, for example, when the iridium compound 100 includes an iridium-transition-metal oxide ($IrMO_x$), the weight ratio of platinum (Pt) and iridium (Ir) may suitably fall in the range of, for example, about 1:0.5 to 1:1. Furthermore, the atomic ratio of platinum (Pt) and the transition metal (M) may suitably fall in the range of, for example, about 1:1 to 1:5.

Figure 4:
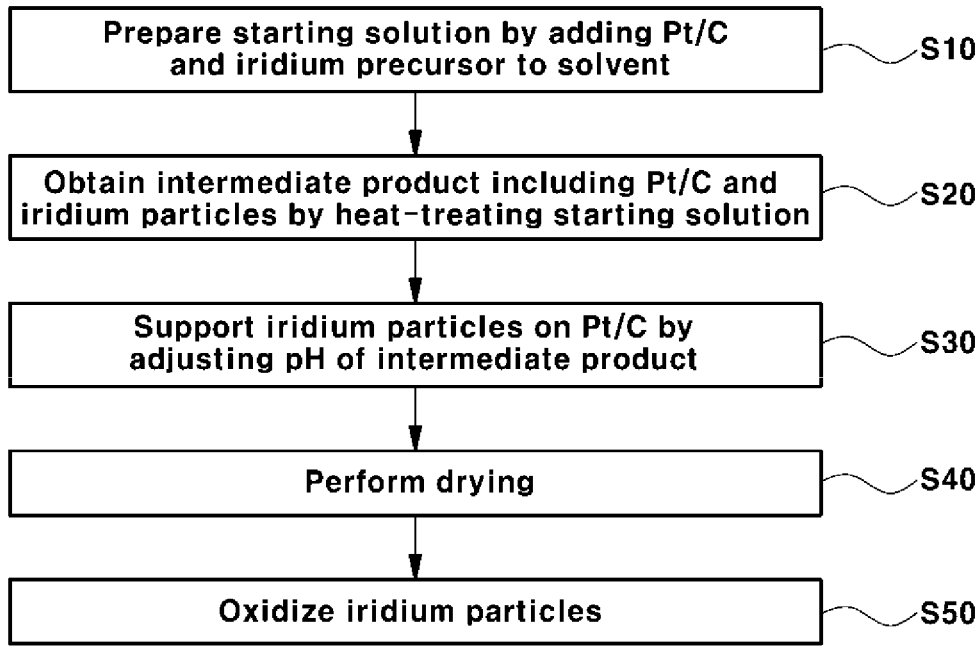
FIG. 4 is a flowchart showing an exemplary process of manufacturing an exemplary catalyst complex for an exemplary fuel cell according to an exemplary embodiment of the present invention.

FIG. 4 shows the process of manufacturing a catalyst complex for a fuel cell according to an exemplary embodiment of the present invention.

As shown in FIG. 4, the method of manufacturing the catalyst complex according to an exemplary embodiment of the present invention may include preparing a starting solution by adding a platinum-supported carbon support (Pt/C) and an iridium precursor to a solvent (S10), obtaining an intermediate product including Pt/C and iridium particles by heat-treating the starting solution (S20), supporting the iridium particles on the Pt/C by adjusting the pH of the intermediate product (S30), drying the resulting product (S40), and oxidizing the iridium particles (S50).

In the preparing the starting solution (S10), the solvent is not particularly limited, and may suitably include, for example, ethylene glycol (EG).

In the preparing the starting solution (S10), Pt/C may be placed in a container having a predetermined shape and volume, after which a small amount of solvent may be added thereto, which may prevent Pt of Pt/C from oxidizing.

The iridium precursor is not particularly limited, and may suitably include, for example, iridium(III) chloride hydrate ($IrCl_3 \cdot xH_2O$).

In the preparing the starting solution (S10), the solvent may be adjusted to a basic pH. For example, the pH of the solvent may be of about 10 or greater, and preferably about 12.

The preparing the starting solution (S10) may be performed in a manner in which the solvent is placed in the container containing Pt/C and sodium hydroxide (NaOH) serving as a pH adjuster is then added thereto so that the solvent is made basic, after which the iridium precursor may be added thereto. For example, the iridium precursor may be added together with sodium acetate ($CH_3COONa$).

In the obtaining the intermediate product (S20), the starting solution may be heat-treated in an inert gas atmosphere and thus the iridium precursor may be formed into iridium particles.

The inert gas is not particularly limited, and may include, for example, nitrogen gas ($N_2$).

The intermediate product may suitably include Pt/C and iridium particles. Here, the iridium particles may not be supported on Pt/C. As used herein, the term "supported" means that a catalyst metal is strongly fixed on the support. In the intermediate product, the iridium particles may not be supported on the Pt/C, and some of the iridium particles may be in physical contact with the Pt/C.

In the obtaining the intermediate product (S20), the starting solution may be heat-treated at a temperature of about 100° C. to 200° C. for about 1 hr to 5 hr in an atmosphere in which inert gas is purged.

Here, the heat treatment may be performed in a manner in which the starting solution is gradually warmed from room temperature to a desired temperature or in which the starting solution is placed in a constant-temperature bath preset to a desired temperature. Preferably, the heat treatment may be carried out through the former process. The voltage reversal time may be about 80 min longer in the former process than in the latter process.

In the supporting the iridium particles (S30), the pH of the intermediate product may be adjusted, and thus the iridium particles may be supported on Pt/C. For example, the intermediate product may be adjusted to an acidic pH ranging from about 0.5 to 3.0, whereby the iridium particles may be supported on Pt/C.

The process of adjusting the pH of the intermediate product is not particularly limited, and may include, for example, adding the intermediate product with at least one of a hydrochloric acid (HCl) solution and an acetic acid ($CH_3COOH$) solution.

The product resulting from supporting the iridium particles on the Pt/C may be dried, and thus the solvent may be removed (S40). For example, the resulting product may be stirred at room temperature for 10 hr or greater, filtered, and then dried in a vacuum oven at a temperature of about 50° C. for about 2 hr.

When the solvent is removed in this way, a kind of a catalyst complex precursor in which the iridium particles may be supported on Pt/C may be obtained.

Thereafter, oxidizing the iridium particles contained in the catalyst complex precursor (S50) may be performed. Thereby, the catalyst complex described above may be obtained.

In the oxidizing the iridium particles (S50), the iridium particles supported on the Pt/C may be oxidized, thus affording the iridium compound represented by Chemical Formula 1.

The process of oxidizing the iridium particles is not particularly limited, and may include, for example, heat-treating the catalyst complex precursor at a temperature of about 200° C. to 400° C., or particularly of about 200° C. to 300° C., for about 1 hr to 5 hr in air.

The method of manufacturing the catalyst complex according to an exemplary embodiment of the present invention may further include the following modification.

Here, the starting solution may further include a transition metal precursor to thus obtain an intermediate product including the Pt/C, iridium particles and transition metal particles.

The transition metal precursor is not particularly limited, and may be selected from the group consisting of, for example, iron(II) chloride ($FeCl_2$), cobalt(II) chloride hexahydrate ($CoCl_2 \cdot 6H_2O$), copper(II) chloride dihydrate ($CuCl_2 \cdot 2H_2O$), and combinations thereof.

Thereafter, the pH of the intermediate product may be adjusted to thus support the iridium particles and the transition metal particles on the Pt/C, the resulting product may be dried, and the iridium particles and the transition metal particles may be oxidized, thereby yielding an iridium compound represented by Chemical Formula 2.

The specific conditions of each step of the above manufacturing method are omitted because they are substantially the same as or similar to those of the above-mentioned method.

Figure 5:
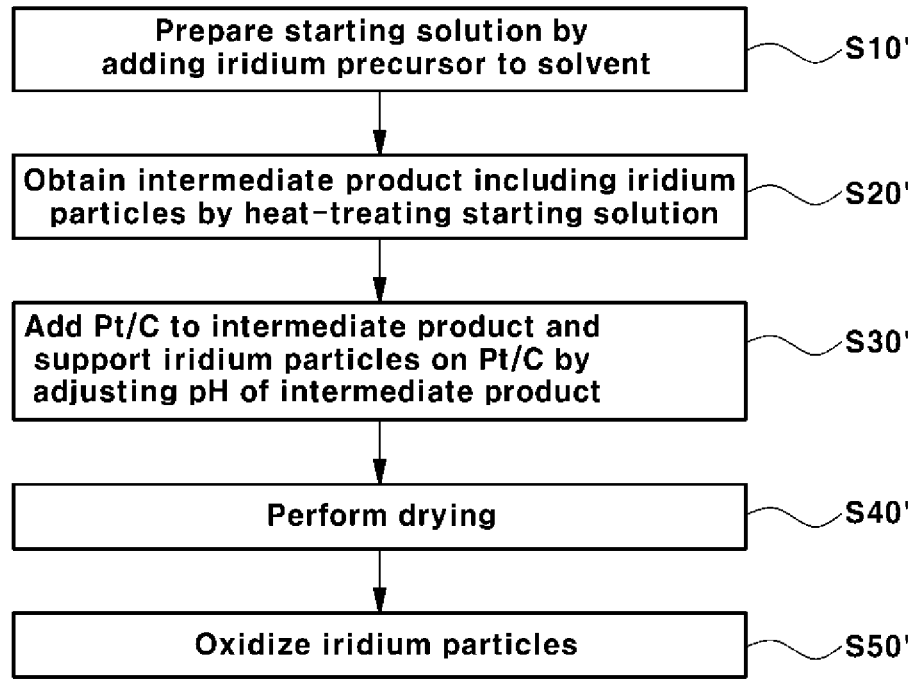
FIG. 5 schematically shows an exemplary process of manufacturing an exemplary catalyst complex for an exemplary fuel cell according to an exemplary embodiment of the present invention.

FIG. 5 shows an exemplary process of manufacturing an exemplary catalyst complex for an exemplary fuel cell according to an exemplary embodiment of the present invention.

As shown in FIG. 5, the method of manufacturing the catalyst complex according to an exemplary embodiment of the present invention may include preparing a starting solution by adding an iridium precursor to a solvent (S10'), obtaining an intermediate product including iridium particles by heat-treating the starting solution (S20'), adding a platinum-supported carbon support (Pt/C) to the intermediate product and supporting the iridium particles on the Pt/C by adjusting the pH of the intermediate product (S30'), drying the resulting product (S40'), and oxidizing the iridium particles (S50').

In the preparing the starting solution (S10'), the solvent is not particularly limited, and may suitably include, for example, ethylene glycol (EG).

The iridium precursor is not particularly limited, and may suitably include, for example, iridium(III) chloride hydrate ($IrCl_3 \cdot xH_2O$).

In the preparing the starting solution (S10'), the solvent may be adjusted to a basic pH. For example, the pH of the solvent may be about 10 or greater, and or particularly of about 12.

The preparing the starting solution (S10') may be performed in a manner in which sodium hydroxide (NaOH), serving as a pH adjuster, may be added to the solvent so that the solvent may be made basic, after which the iridium precursor may be added thereto. For example, the iridium precursor may be added together with sodium acetate ($CH_3COONa$).

In the obtaining the intermediate product (S20'), the starting solution may be heat-treated in an inert gas atmosphere, whereby the iridium precursor is formed into iridium particles.

The inert gas is not particularly limited, and may include, for example, nitrogen gas ($N_2$).

In the obtaining the intermediate product (S20'), the starting solution may be heat-treated at a temperature of about 100° C. to 200° C. for about 1 hr to 5 hr in the atmosphere in which the inert gas is purged.

The heat treatment may be performed in a manner in which the starting solution is gradually warmed from room temperature to a desired temperature or in which the starting solution is placed in a constant-temperature bath preset to a desired temperature. Preferably, the heat treatment may be carried out through the former process. The voltage reversal time may be about 80 min longer in the former process than in the latter process.

The above manufacturing method may further include cooling the intermediate product to room temperature.

In the supporting the iridium particles (S30'), the intermediate product may be added with Pt/C, after which the pH of the intermediate product may be adjusted and thus the iridium particles are supported on Pt/C. For example, the intermediate product may suitably be adjusted to an acidic pH ranging from about 0.5 to 3.0, whereby the iridium particles are supported on Pt/C.

The process of adding the Pt/C is not particularly limited, and may include, for example, preparing an acid solution such as a hydrochloric acid solution or an acetic acid solution, including the Pt/C, and then adding the acid solution to the intermediate product.

The process of adjusting the pH of the intermediate product is not particularly limited, and may suitably include, for example, adding the intermediate product with at least one of a hydrochloric acid (HCl) solution and an acetic acid ($CH_3COOH$) solution.

The product resulting from supporting the iridium particles on the Pt/C is dried, and thus the solvent may be removed (S40'). For example, the resulting product may be stirred at room temperature for about 10 hr or greater, filtered, and then dried in a vacuum oven at a temperature of about 50° C. for about 2 hr.

When the solvent is removed in this way, a kind of catalyst complex precursor in which the iridium particles are supported on Pt/C may be obtained.

Thereafter, oxidizing the iridium particles contained in the catalyst complex precursor (S50') may be performed. Thereby, the catalyst complex described above may be obtained.

In the oxidizing the iridium particles (S50'), the iridium particles supported on the Pt/C may be oxidized, thus affording the iridium compound represented by Chemical Formula 1.

The process of oxidizing the iridium particles is not particularly limited, and may include, for example, heat-treating the catalyst complex precursor at a temperature of about 200° C. to 400° C., or particularly of about 200° C. to 300° C., for about 1 hr to 5 hr in air.

The method of manufacturing the catalyst complex according to an exemplary embodiment of the present invention may further include the following modification.

The starting solution may be further added with a transition metal precursor to thus obtain an intermediate product including the iridium particles and transition metal particles.

The transition metal precursor is not particularly limited, and may be selected from the group consisting of, for example, iron(II) chloride ($FeCl_2$), cobalt(II) chloride hexahydrate ($CoCl_2 \cdot 6H_2O$), copper(II) chloride dihydrate ($CuCl_2 \cdot 2H_2O$), and combinations thereof.

Thereafter, the intermediate product is added with Pt/C, and the pH of the intermediate product may be adjusted to thus support the iridium particles and the transition metal particles on the Pt/C, the resulting product may be dried, and the iridium particles and the transition metal particles may be oxidized, thereby yielding an iridium compound represented by Chemical Formula 2.

The specific conditions of each step of the above manufacturing method are omitted because they are substantially the same as or similar to those of the above-mentioned methods.

EXAMPLE

A better understanding of the present invention will be given through the following examples and test examples, which are merely set forth to illustrate the present invention but are not to be construed as limiting the present invention. Examples 1 to 5 of the present invention may be exemplified by Pt—$IrO_x$/C. In Comparative Example 1, an anode catalyst not including a voltage reversal catalyst is described by way of example, and in Comparative Example 2, a catalyst in which Pt/C was mixed with $IrO_x$ as in a conventional technique is described by way of example. In Comparative Example 2, the ratio of Pt and Ir was 2:1, and $IrO_x$ was synthesized through an Adams Fusion method.

The processing conditions are shown schematically in Table 1 below.

intermediate product including Pt/C and iridium particles and cooling the intermediate product to room temperature;

(S30) adding the intermediate product with a 10% hydrochloric acid (HCl) solution to adjust the pH thereof to 0.5, thereby supporting the iridium particles on Pt/C;

(S40) stirring the intermediate product at room temperature for 10 hr or greater, followed by filtering and drying in a vacuum oven at a temperature of 50° C. for 2 hr; and (S50) heat-treating the dried product in an electric furnace at a temperature of 200° C. for 2 hr in air so as to oxidize the surface of the iridium particles, ultimately yielding a catalyst complex configured such that platinum and iridium oxide are supported on the carbon support.

Example 2

A catalyst complex was manufactured in the same manner as in Example 1, with the exception that in the preparing the starting solution (S10), Pt/C was not added, and Pt/C was added to the intermediate product cooled to room temperature, and specifically, a 3% hydrochloric acid solution including Pt/C was added to the intermediate product.

Example 3

A catalyst complex was manufactured in the same manner as in Example 2, with the exception that a 14% acetic acid solution including Pt/C was added to the intermediate product.

TABLE 1

| No. | Voltage reversal catalyst | Pt:Ir (weight ratio) | Synthesis method | Pt/C addition step | Heat treatment conditions Temp. | Gas atmosphere |
|---|---|---|---|---|---|---|
| Comparative Example 1 | Pt/C[1)] | 1:0 | Pt/C (Commercially available) | — | — | Air |
| Comparative Example 2 | Pt/C + $IrO_x$[2)] | 1:0.5 | Mixture of Pt/C and IrOx prepared by Adams Fusion method | — | — | Air |
| Comparative Example 3 | | 1:0.125 | The following | Addition to starting solution | 200° C. | Air |
| Comparative Example 4 | Pt—$IrO_x$/C[3)] | 1:0.25 | | | 200° C. | Air |
| Comparative Example 5 | | 1:0.4 | | | 200° C. | Air |
| Comparative Example 6 | Pt—Ir/C[4)] | 1:0.5 | | | 200° C. | 25% $H_2$/ 75% $N_2$ |
| Example 1 | | 1:0.5 | | | 200° C. | Air |
| Example 2 | | 1:0.5 | | Addition to intermediate product | 200° C. | Air |
| Example 3 | | 1:0.5 | | | 200° C. | Air |
| Example 4 | Pt—$IrO_x$/C | 1:0.5 | | | 200° C. | Air |
| Example 5 | | 1:0.5 | | | 100° C. | Air |
| Example 6 | | 1:0.5 | | | 300° C. | Air |
| Example 7 | | 1:0.5 | | | 400° C. | Air |
| Example 8 | Pt—$IrFeO_x$/C | 1:0.5 | The following | | 200° C. | Air |
| Example 9 | Pt—$IrFeO_x$/C | 1:0.5 | | | 200° C. | Air |
| Example 10 | Pt—$IrCoO_x$/C | 1:0.5 | | | 200° C. | Air |
| Example 11 | Pt—$IrCoO_x$/C | 1:0.5 | | | 200° C. | Air |
| Example 12 | Pt—$IrCuO_x$/C | 1:0.5 | | | 200° C. | Air |
| Example 13 | Pt—$IrCuO_x$/C | 1:0.5 | | | 200° C. | Air |

In Table 1,
[1)]means a platinum-supported carbon support
[2)]means a simple mixture of a platinum-supported carbon support and $IrO_x$
[3)]means that platinum and $IrO_x$ are supported on a carbon support
[4)]means that platinum and Ir are supported on a carbon support

Example 1

A catalyst complex was synthesized by sequentially performing the following steps:

(S10) adding a small amount of EG solvent to a flask containing Pt/C to prevent oxidation of Pt, adding NaOH and EG to adjust the pH of the solution to 12, and adding iridium(III) chloride hydrate ($IrCl_3 \cdot xH_2O$) and sodium acetate ($CH_3COONa$), thus preparing a starting solution;

(S20) treating the starting solution at a temperature of 160° C. for 3 hr in a nitrogen-purged atmosphere to yield an

Example 4

A catalyst complex was manufactured in the same manner as in Example 2, with the exception that a 0.3% hydrochloric acid solution including Pt/C was added to the intermediate product.

Example 5

A catalyst complex was manufactured in the same manner as in Example 4, with the exception that in the oxidizing the iridium particles (S50), the heat treatment temperature was adjusted to a temperature of 100° C.

Example 6

A catalyst complex was manufactured in the same manner as in Example 4, with the exception that in the oxidizing the iridium particles (S50), the heat treatment temperature was adjusted to a temperature of 300° C.

Example 7

A catalyst complex was manufactured in the same manner as in Example 4, with the exception that in the oxidizing the iridium particles (S50), the heat treatment temperature was adjusted to a temperature of 400° C.

Example 8

A catalyst complex was synthesized by sequentially performing the following steps:

(S10) adding NaOH to an EG (ethylene glycol) solvent to adjust the pH of the solution to 12 and then adding iridium (III) chloride hydrate ($IrCl_3 \cdot xH_2O$), sodium acetate ($CH_3COONa$) and iron(II) chloride ($FeCl_2$) thereto, thus preparing a starting solution having nanoparticles of Ir and Fe;

(S20) slowly heating the starting solution from room temperature to 160° C. in a nitrogen-purged atmosphere, followed by maintaining the temperature for 3 hr and cooling to room temperature;

(S30) adding the resulting product with a 3% hydrochloric acid (HCl) solution including Pt/C, and then with a 10% HCl solution to obtain a pH of 0.5;

(S40) stirring the resulting product at room temperature for 10 hr or greater, followed by filtering and drying in a vacuum oven at 50° C. for 2 hr; and (S50) heat-treating the dried product in an electric furnace at a temperature of 200° C. for 2 hr in air.

Example 9

A catalyst complex was manufactured in the same manner as in Example 8, with the exception that in (S20), fast heating was performed in a manner in which the starting solution was placed in a constant-temperature bath preset to a temperature of 160° C. and treated for 3 hr in a nitrogen atmosphere.

Example 10

A catalyst complex was manufactured in the same manner as in Example 8, with the exception that in (S10), cobalt(II) chloride hexahydrate ($CoCl_2 \cdot 6H_2O$) was used in lieu of iron chloride.

Example 11

A catalyst complex was manufactured in the same manner as in Example 9, with the exception that in (S10), cobalt(II) chloride hexahydrate ($CoCl_2 \cdot 6H_2O$) was used in lieu of iron chloride.

Example 12

A catalyst complex was manufactured in the same manner as in Example 8, with the exception that in (S10), copper(II) chloride dihydrate ($CuCl_2 \cdot 2H_2O$) was used in lieu of iron chloride.

Example 13

A catalyst complex was manufactured in the same manner as in Example 9, with the exception that in (S10), copper(III) chloride dihydrate ($CuCl_2 \cdot 2H_2O$) was used in lieu of iron chloride.

Comparative Example 1

An anode catalyst not including a voltage reversal catalyst was used.

Comparative Example 2

A catalyst in which Pt/C was mixed with $IrO_x$, as in the conventional technique, was used. Here, the ratio of Pt and Ir was 2:1, and $IrO_x$ was synthesized through an Adams Fusion method.

Comparative Examples 3 to 5

The same procedures as in Example 1 were performed, but the amounts of Pt/C and iridium(III) chloride hydrate ($IrCl_3 \cdot xH_2O$) that were added were adjusted. In Comparative Example 3, Pt:Ir=1:0.125, in Comparative Example 4, Pt:Ir=1:0.25, and in Comparative Example 5, Pt:Ir=1:0.4.

Comparative Example 6

A catalyst complex was manufactured in the same manner as in Example 1, with the exception that reduction treatment was performed under conditions of 25% $H_2$/75% $N_2$ and 200° C., in lieu of oxidizing the iridium particles (S50).

Evaluation Method

Manufacture of Fuel Cell

In order to evaluate the voltage reversal tolerance of each of Examples and Comparative Examples, a fuel cell was manufactured using the catalyst complex of each of Examples and Comparative Examples and subjected to voltage reversal tolerance testing through the following procedures.

(1) A catalyst slurry was prepared using the catalyst of each of Examples and Comparative Examples and then sprayed onto GDL (39BC, SGL), thus forming an anode. The weight ratio of a perfluorinated sulfonic acid ionomer dispersion (5 wt % Nafion Dispersion, DuPont Co., USA) and carbon was 0.8, and each loading amount was as follows.

Comparative Examples 1, 2 and Examples 1 to 7: 0.1 $mg_{Pt}/cm^2$+0.05 $mg_{Ir}/cm^2$ Comparative Example 3: 0.1 $mg_{Pt}/cm^2$+0.0125 $mg_{Ir}/cm^2$ Comparative Example 4: 0.1 $mg_{Pt}/cm^2$+0.025 $mg_{Ir}/cm^2$ Comparative Example 5: 0.1 $mg_{Pt}/cm^2$+0.04 $mg_{Ir}/cm^2$ (2) A cathode was formed by preparing a catalyst slurry using the same Pt/C catalyst and spraying the catalyst slurry on GDL (39BC, SGL). The weight ratio of a perfluorinated sulfonic acid ionomer dispersion (5 wt % Nafion Dispersion, DuPont Co., USA) and carbon was 0.8, and the amount of Pt that was loaded was 0.4 $mg_{Pt}/cm^2$.

(3) A membrane-electrode assembly (MEA) was manufactured by disposing the anode and the cathode on both sides of an electrolyte membrane (NRE211, Dupont) and pressing them under a pressure of 430 psi at a temperature of 135° C. for 135 sec.

(4) A fuel cell was manufactured using a titanium (Ti) anode separator plate, MEA, and a graphite cathode separator plate.

Here, the torque applied to the eight bolts used for cell fastening was 50 kgf·cm.

Activation of Fuel Cell 200 ml/min of hydrogen and 600 ml/min of air were supplied to the anode and the cathode, respectively, and the cell voltage was increased by 100 $mA/cm^2$ each for 1 sec in the state of OCV (Open Circuit Voltage) until it reached 0.25 V. After the cell voltage reached 0.25 V, the above procedures were repeated until OCV and performance were stabilized. The cell temperature was 65° C., and the relative humidity was 100%.

Voltage Reversal Tolerance Testing Method—Measurement of Cell Voltage Depending on Voltage Reversal Time after Stopping of Hydrogen Supply The cell voltage was measured for voltage reversal tolerance testing at a cell temperature of 65° C. and a relative humidity of 100% through the following method.

(1) An electric load was applied at a current density of 0.2 $A/cm^2$, and hydrogen and air were supplied at a stoichiometric ratio (SR) of 1.5:2.0.

(2) 5 min after application of the electric load, hydrogen supply to the anode side was stopped and argon was supplied at the same flow rate.

(3) The time and voltage were measured until the cell voltage reached −2.5 V.

(4) The time required for the cell voltage to reach −2.5 V from 0 V was determined to be the voltage reversal time.

Thus, the results of measurement of voltage reversal time of Examples and Comparative Examples are shown in Table 2 below.

TABLE 2

| No. | Voltage reversal time | No. | Voltage reversal time |
|---|---|---|---|
| Comparative Example 1 | About 5 min | Example 1 | About 124 min |
| Comparative Example 2 | About 62 min | Example 2 | About 210 min |
| Comparative Example 3 | About 15 min | Example 3 | About 220 min |
| Comparative Example 4 | About 28 min | Example 4 | About 250 min |
| Comparative Example 5 | About 45 min | Example 5 | About 240 min |
| Comparative Example 6 | About 30 min | Example 6 | About 1070 min |
| | | Example 7 | About 70 min |
| | | Example 8 | About 210 min |
| | | Example 9 | About 130 min |

Evaluation Results

Evaluation Example 1: Evaluation of Voltage Reversal Time

FIGS. 6 to 9 are graphs showing the voltage reversal time results of Examples and Comparative Examples.

Figure 6:
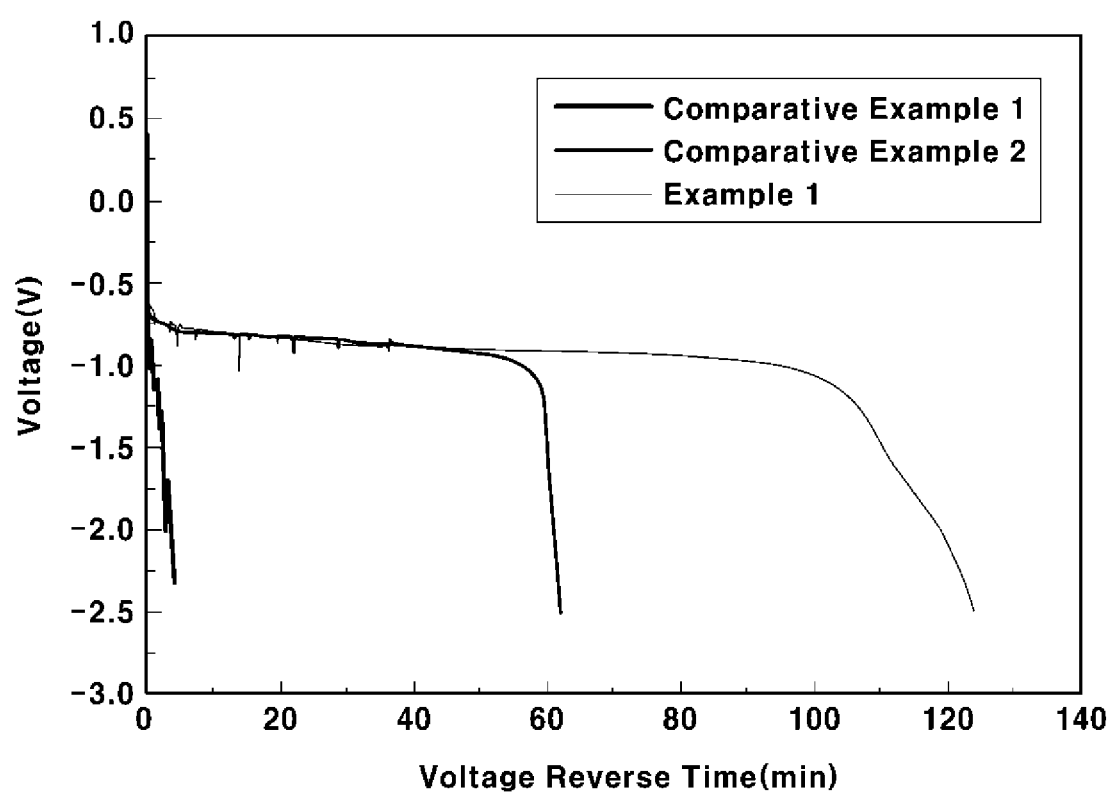
FIG. 6 is a graph showing the results of voltage reversal time of Example 1, Comparative Example 1 and Comparative Example 2.
Figure 7:
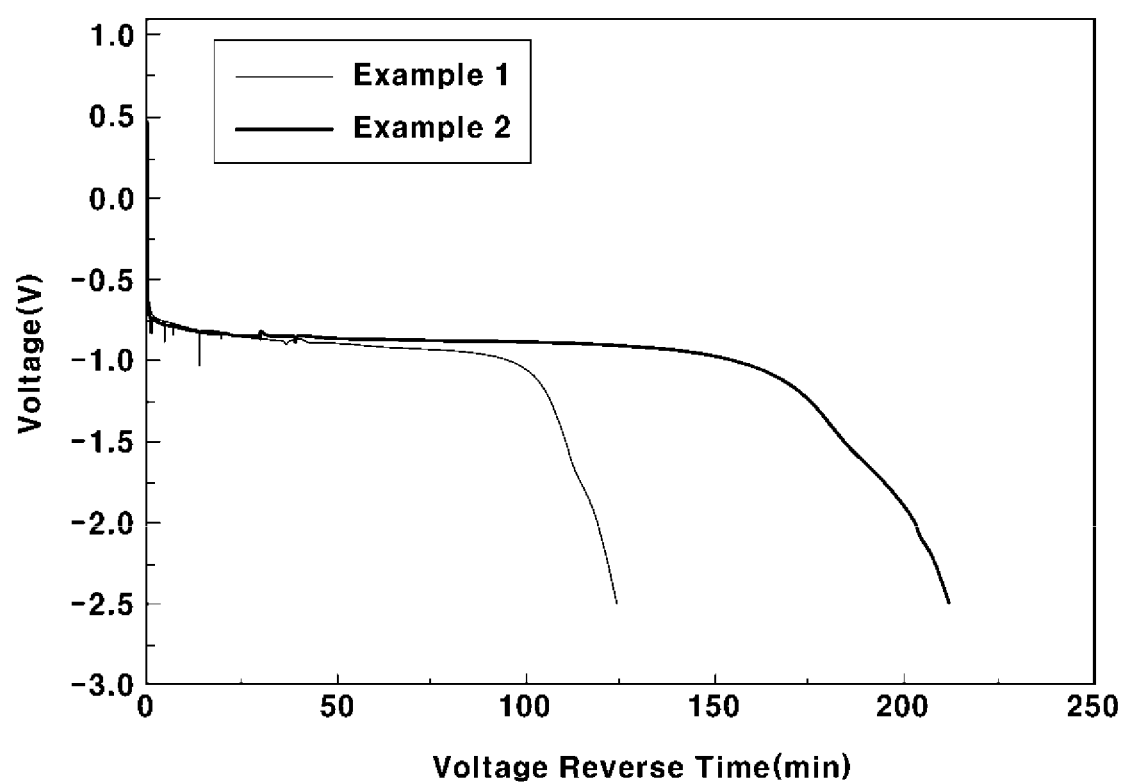
FIG. 7 is a graph showing the results of voltage reversal time of Example 1 and Example 2.
Figure 8:
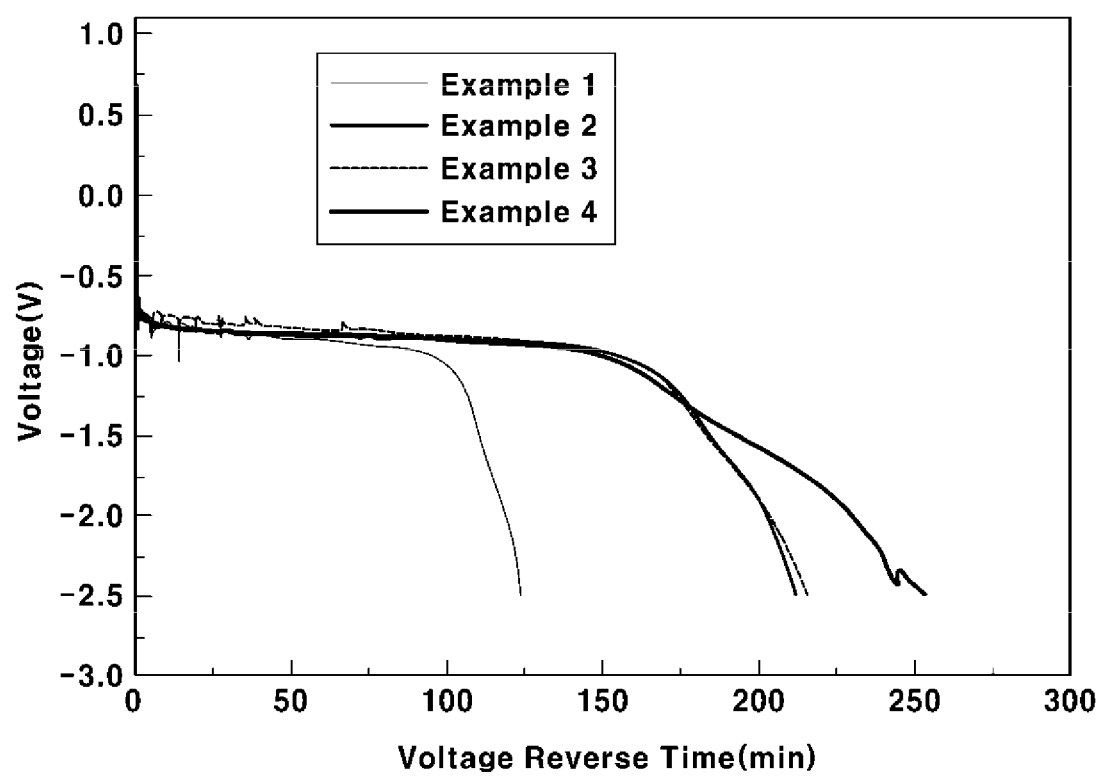
FIG. 8 is a graph showing the results of voltage reversal time of Example 1 to Example 4.
Figure 9:
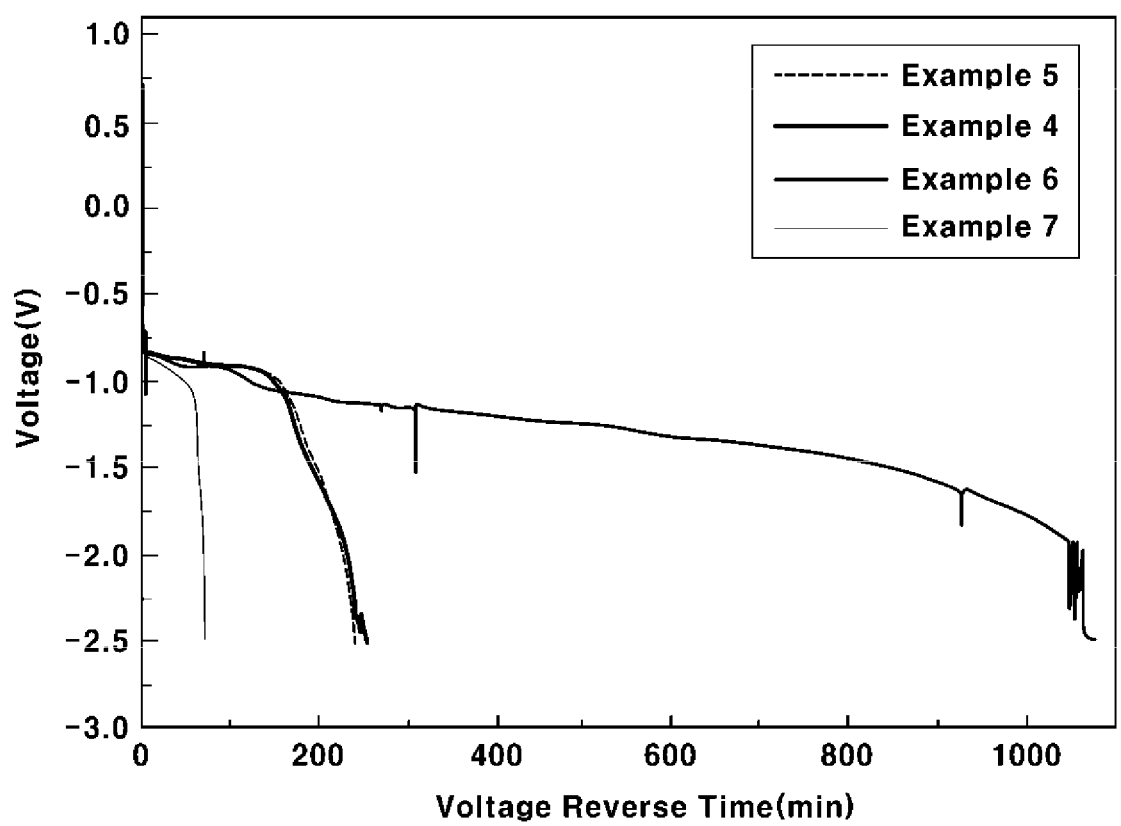
FIG. 9 is a graph showing the results of voltage reversal time of Example 4 to Example 7.

As shown in FIG. 6, the voltage reversal time was significantly increased in Example 1 compared to Comparative Examples 1 and 2. With reference to FIGS. 7 to 9, in all the Examples according to the present invention (Examples 1 to 7), the voltage reversal time was increased at least about 25 times compared to Comparative Example 1 and at least 2 times compared to Comparative Example 2.

With reference to FIG. 7, when the addition of Pt/C was performed in S30 during the synthesis process in Example 2, the voltage reversal time was increased by about 86 min compared to Example 1. This is deemed to be because the time of addition of Pt/C was changed to thereby reduce the aggregation of platinum (Pt) particles, thus maintaining the coverage of carbon.

With reference to FIG. 8, in Examples 3 and 4, 14% acetic acid and 0.3% hydrochloric acid were added in S30 during the synthesis process, whereby the voltage reversal time was increased by 10 to 40 min compared to Example 2. This is deemed to be because damage to carbon was reduced in a weakly acidic environment.

As shown in FIG. 9, in the voltage reversal time depending on the heat treatment temperature in Examples 4, 6 and 7, it can be seen that the effect of reducing the voltage reversal degradation was ensured even upon heat treatment at a relatively low temperature of 100° C. or more for Ir surface oxidation at a similar level of about 10 min. In Example 6, in which the heat treatment was performed at 300° C., the voltage reversal time was increased about 17 times compared to Comparative Example 2, showing the best effect. On the other hand, it is preferable that heat treatment be carried out at a higher temperature in order to oxidize iridium, but when the heat treatment temperature exceeds 400° C., the support carbon may be oxidized. Hence, it is preferable to perform heat treatment within the range from 200 to 400° C.

Evaluation Example 2: Evaluation of Supported $IrO_x$ Distribution

Figure 10:
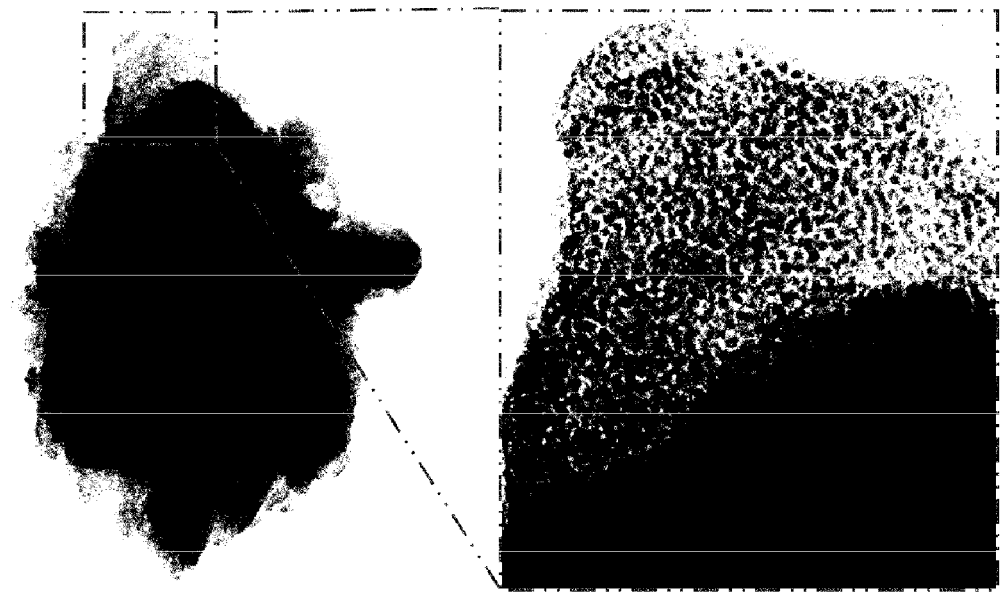
FIGS. 10 and 11 show the distribution of an iridium compound in the catalyst complex for a fuel cell of Comparative Example and Example.
Figure 11:
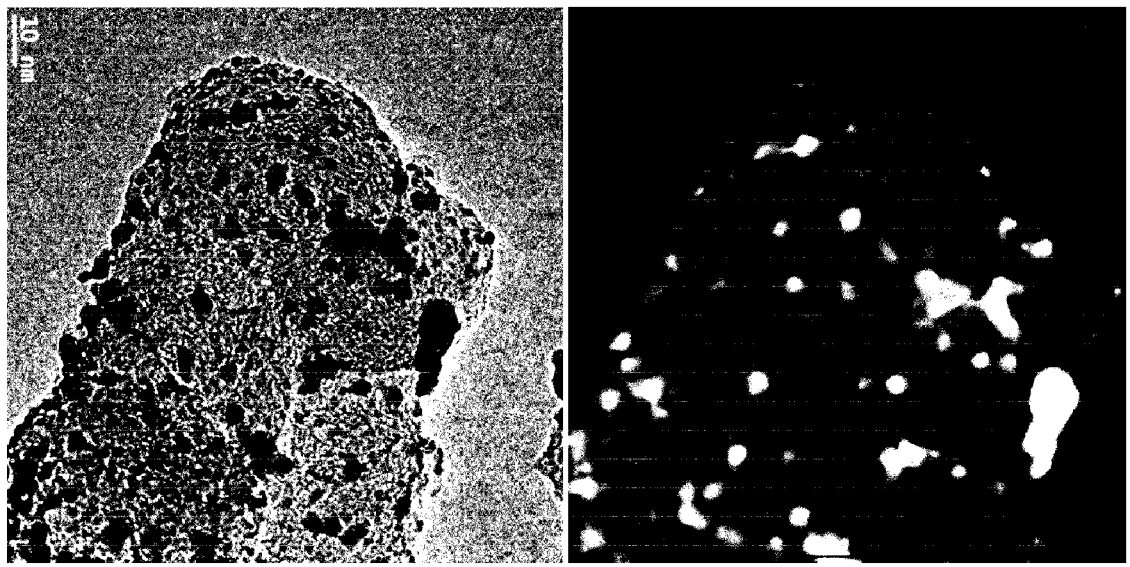

FIGS. 10 and 11 show the distribution of the iridium compound in the catalyst complex for a fuel cell in Comparative Example and Example.

As shown in FIG. 10, as shown in the right enlarged view, $IrO_x$ (Comparative Example 2), synthesized through an Adams Fusion method, was an arbitrary lump structure having no formal size.

On the other hand, as shown in FIG. 11, $IrO_x$, having a size of about 2 nm, was uniformly distributed on the carbon support of Examples (Pt—$IrO_x$/C). Accordingly, an increase in catalytic activity can be expected.

Figure 12:
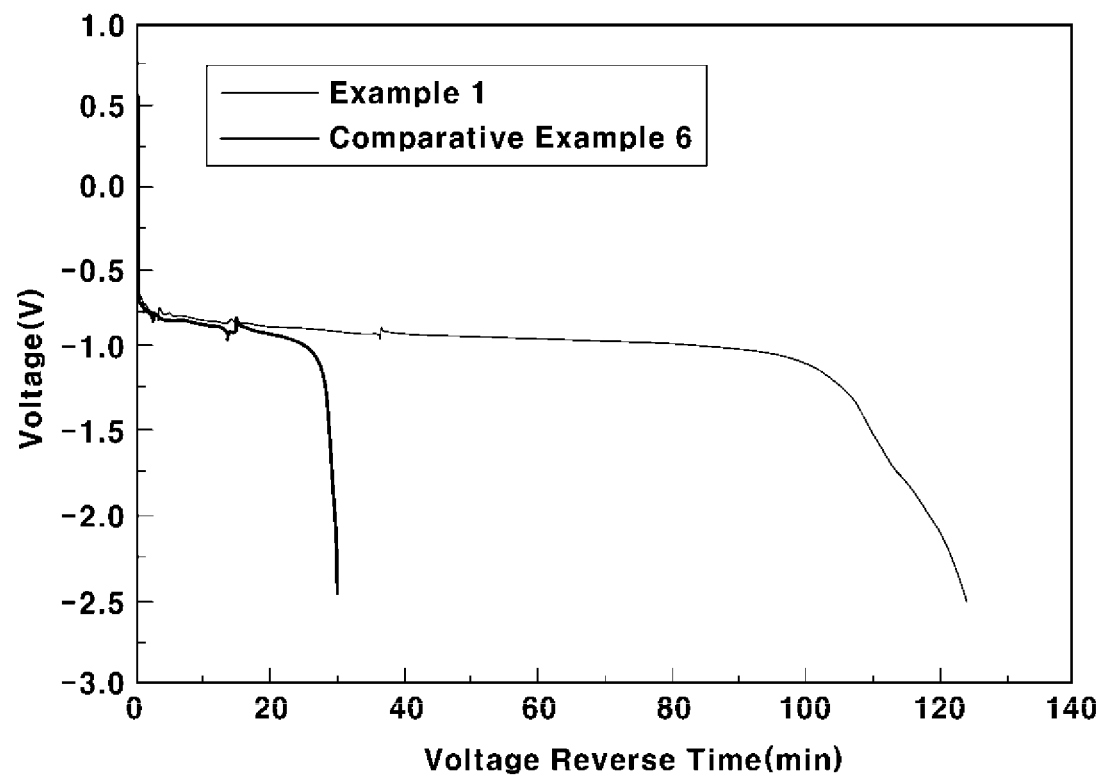
FIG. 12 is a graph showing the results of voltage reversal time of Example 1 and Comparative Example 6.

Evaluation Example 3: Evaluation of Voltage Reversal Time Depending on Heat Treatment Conditions As shown in FIG. 12, the results of voltage reversal time were compared in Comparative Example 6 (Pt—Ir/C), in which hydrogen-reduction heat treatment was performed at a temperature of 200° C., and in Example 1, in which heat treatment was performed at a temperature of 200° C. in air. In Example 1, having the Pt—$IrO_x$/C structure heat-treated at a temperature of 200° C. in air, the voltage reversal time was increased compared to Comparative Example 6, imparted with the Pt—Ir/C structure through hydrogen-reduction heat treatment at a temperature of 200° C. It was confirmed that the oxidized structure of Ir contributes to alleviating the voltage reversal of the fuel cell in the catalyst structure supported in the same manner. Considering the voltage reversal time (about 62 min) of Comparative Example 2 according to the conventional technique, it can be assumed that the oxidized structure of Ir is a factor that contributes to the voltage reversal tolerance of the fuel cell.

Figure 13:
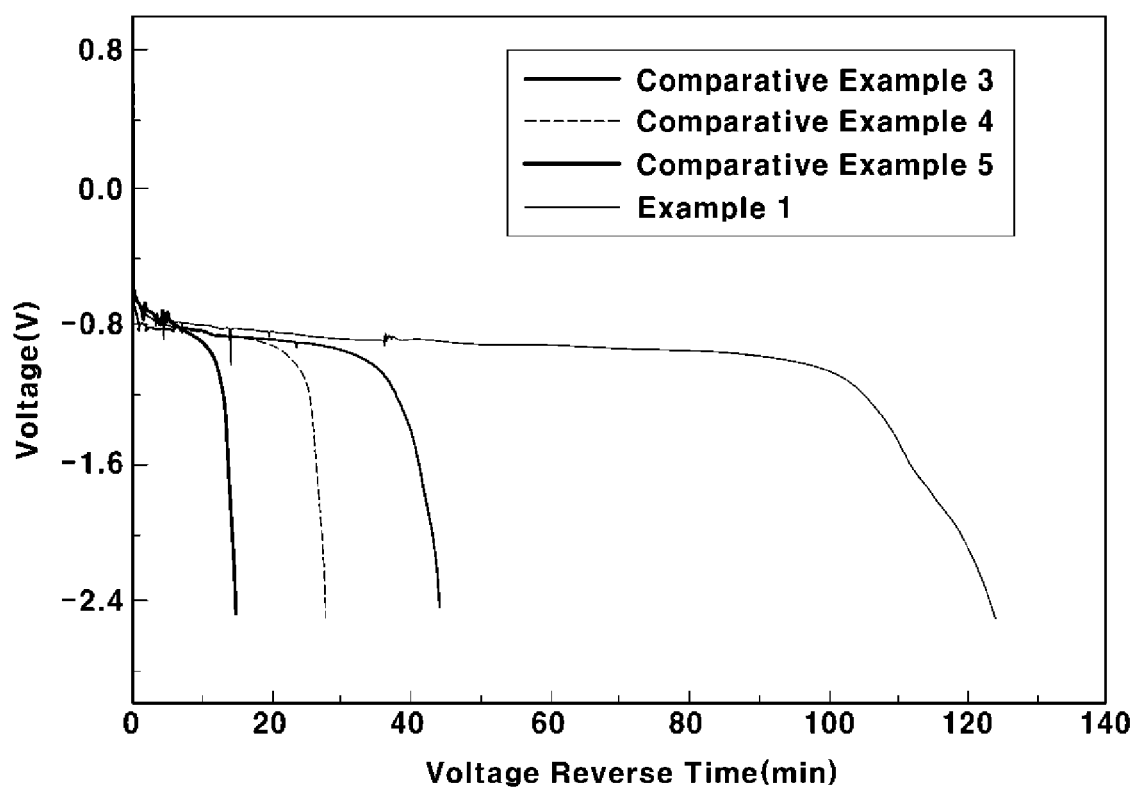
FIG. 13 is a graph showing the results of voltage reversal time of Example 1 and Comparative Examples 3 to 5.

Evaluation Example 4: Evaluation of Voltage Reversal Time Depending on Weight Ratio of Pt and Ir With reference to FIG. 13, in the Pt—IrO$_x$/C catalyst, the voltage reversal time was evaluated depending on the weight ratio of Pt and Ir. As shown in FIG. 13, the results of voltage reversal time were compared in Example 1 (Pt:Ir=1:0.5), Comparative Example 3 (Pt:Ir=1:0.125), Comparative Example 4 (Pt:Ir=1:0.25) and Comparative Example 5 (Pt:Ir=1:0.4). Taking into consideration the voltage reversal time of 62 min in Comparative Example 2, it was concluded that the ratio of Pt and Ir (Ir/Pt) was preferably 0.5 or more.

Although the distribution of IrO$_x$ is limited in the electrode structure in which Pt/C and IrO$_x$ are mixed according to the conventional technique, IrO$_x$ and Pt can be supported together on the carbon support, and moreover, a highly dispersed structure can be formed in the present invention, thereby increasing water decomposition activity upon voltage reversal of the fuel cell and electrical connectivity, ultimately increasing voltage reversal tolerance. Accordingly, when the voltage reversal of the fuel cell occurs, it can be controlled stably compared to conventional cases, making it possible to increase the lifespan of the fuel cell stack and also to realize cost reduction by decreasing the replacement cost.

Evaluation Example 5

Figure 14:
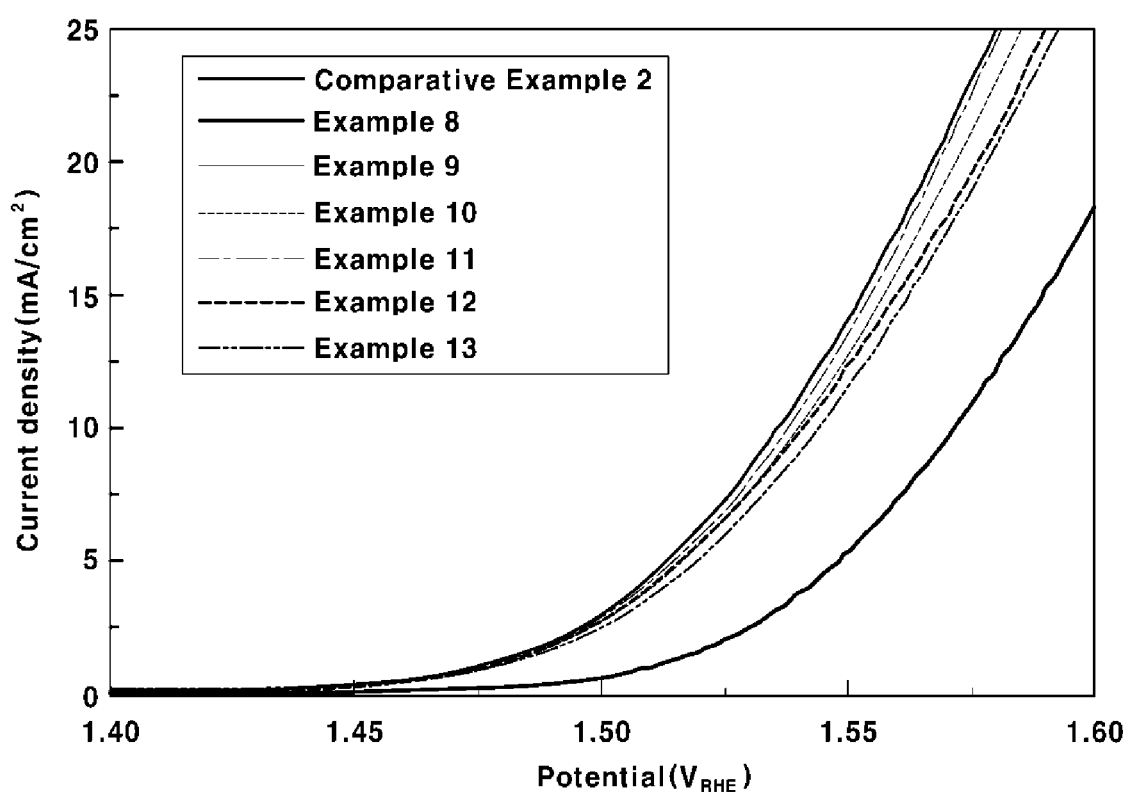
FIG. 14 shows the results of measurement of the activity of the catalyst complex of each of Comparative Example 2 and Examples 8 to 13 for water decomposition through a half-electrode test.

The activity of the catalyst complex of each of Comparative Example 2 and Examples 8 to 13 for water decomposition was measured through a half-electrode test. The results are shown in FIG. 14. With reference thereto, the activity of the catalyst complex of Examples 8 to 13 was found to be superior compared to Comparative Example.

Although the various exemplary embodiments of the present invention have been disclosed for illustrative purposes, those skilled in the art will appreciate that various modifications are possible without departing from the scope and spirit of the invention as disclosed in the accompanying claims, and such modifications should not be understood separately from the technical ideas or essential characteristics of the present invention.

What is claimed is:

1. A method of manufacturing a catalyst complex, comprising:
    preparing a starting solution comprising a platinum-supported carbon support, an iridium precursor, and a solvent;
    obtaining an intermediate product comprising the platinum-supported carbon support and iridium particles by heat-treating the starting solution;
    supporting the iridium particles on the platinum-supported carbon support by adjusting a pH of the intermediate product;
    drying a resulting product; and
    oxidizing the iridium particles.

2. The method of claim 1, wherein in the preparing the starting solution, the solvent is adjusted to a basic pH.

3. The method of claim 1, wherein the intermediate product is obtained by heat-treating the starting solution at a temperature of 100° C. to 200° C. for 1 hr to 5 hr in an inert gas atmosphere.

4. The method of claim 1, wherein the intermediate product is made acidic in a pH range of 0.5 to 3.0 and thus the iridium particles are supported on the platinum-supported carbon support.

5. The method of claim 1, wherein the iridium particles are oxidized by heat-treating the dried product at a temperature of 200° C. to 400° C. for 1 hr to 5 hr in air.

6. The method of claim 1, wherein the starting solution further comprises a transition metal precursor and the intermediate product comprises the platinum-supported carbon support, the iridium particles and transition metal particles.

7. The method of claim 6, wherein the pH of the intermediate product is adjusted to thus support the iridium particles and the transition metal particles on the platinum-supported carbon support.

8. The method of claim 7, wherein the resulting product is dried, and the iridium particles and the transition metal particles are oxidized.

9. A method of manufacturing a catalyst complex, comprising:
    preparing a starting solution comprising an iridium precursor and a solvent;
    obtaining an intermediate product comprising iridium particles by heat-treating the starting solution;
    adding a platinum-supported carbon support to the intermediate product and supporting the iridium particles on the platinum-supported carbon support by adjusting a pH of the intermediate product;
    drying a resulting product; and
    oxidizing the iridium particles.

10. The method of claim 9, wherein in the preparing the starting solution, the solvent is adjusted to a basic pH.

11. The method of claim 9, wherein the intermediate product is obtained by heat-treating the starting solution at a temperature of 100° C. to 200° C. for 1 hr to 5 hr in an inert gas atmosphere.

12. The method of claim 9, wherein the intermediate product comprises the platinum-supported carbon support, after which the intermediate product is made acidic in a pH range of 0.5 to 3.0 and thus the iridium particles are supported on the platinum-supported carbon support.

13. The method of claim 9, wherein the iridium particles are oxidized by heat-treating the dried product at a temperature of 200° C. to 400° C. for 1 hr to 5 hr in air.

14. The method of claim 9, wherein the starting solution further comprises a transition metal precursor, the intermediate product comprises the iridium particles, transition metal particles and the platinum-supported carbon support.

15. The method of claim 14, wherein the pH of the intermediate product is adjusted to thus support the iridium particles and the transition metal particles on the platinum-supported carbon support.

16. The method of claim 15, wherein the resulting product is dried, and the iridium particles and the transition metal particles are oxidized.

* * * * *